Patented Jan. 18, 1938

2,106,131

UNITED STATES PATENT OFFICE 2,106,131

METHOD OF PRODUCING STRONTIUM CARBONATE

Harvey G. Elledge and Alfred Hirsch, Painesville, Ohio, assignors to Diamond Alkali Company, Painesville, Ohio, a corporation of Delaware No Drawing. Application May 24, 1934, Serial No. 727,364

2 Claims. (Cl. 23—66)

This invention relates to a process of converting strontium sulphate to strontium carbonate and is a continuation in part of our copending application Serial No. 679,076, filed July 5, 1935.

The conversion is based upon the double decomposition reaction:

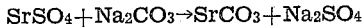
$$SrSO_4 + Na_2CO_3 \rightarrow SrCO_3 + Na_2SO_4$$

which is well known and to which, broadly, we make no claim. It is one object of our invention to reduce the time required to effect this conversion, it having previously required many days or an expensive process of attrition during the reaction which itself required several hours. By our method, relying upon fine subdivision, dilute reaction mix and the presence of a catalyst as well as adjustment of the proportions of reactants, we are able to effect the conversion, substantially completely, in a few minutes. Another object is to obtain a product which is readily washed free from sodium sulphate. Still further objects will appear from the following description and will be defined in the appended claims.

The invention is applicable to treatment of strontium sulphate from whatever source obtained but will be described in particular reference to our experiments with the mineral celestite. Where strontium sulphate is produced by the treatment with sulphuric acid of sludges from the process of our said application, as indicated therein, it may be converted into the carbonate by means of our novel process and this material may be treated alone, or in admixture with celestite; or celestite may be treated alone. The sulphate derived from the sludges has about the same characteristics as that portion of the mineral passing a 150 mesh sieve.

In applying our invention to celestite we have treated the same in such a state of subdivision as to pass, substantially all, through a standard sieve of 40 meshes per inch. The state of subdivision varied from 40 mesh to a fineness exceeding 200 mesh, about 60% passing a 200 mesh sieve and about 75% passing a 150 mesh sieve.

We have found that best results were obtained by treating the ore in aqueous medium, the optimum ratio of water to ore being about 15 to 1, and excellent results being obtained within the range of from 10 to 1 to 20 to 1. This is equivalent to treating the dry ore or a thick slurry thereof with soda ash solution of, considering the varying excesses of soda ash over the theoretical, concentrations of from about five to about fifteen percent, the preferred range being about six to ten percent.

Treatment should be carried on at a temperature approaching the boiling point of water, preferably from 90° C. to 100° C. The reaction is substantially complete after a period of five minutes, no harm being done, however, if it is allowed to continue for ten minutes or a longer period.

Under the above stated conditions, we have found that the treatment of the ore with the molecular proportion of sodium carbonate in the presence of sodium hydroxide results in a fair conversion to strontium carbonate in about five minutes, and that the conversion is increased by the use of an excess of sodium carbonate over the molecular proportion up to about 10%. The presence in the reaction mixture of sodium hydroxide up to about 100% of the weight of the ore results in an increase in conversion, varying in accordance with the quantity of caustic, up to a maximum, the maximum being attained when the weight of the sodium hydroxide is approximately equal to that of the ore. Both the factors of excess of sodium carbonate and the presence of sodium hydroxide in the reaction mixture improve the conversion within limited ranges.

When ore as coarse as about 40 mesh is treated in the presence of sodium hydroxide, in quantity up to about 100% of the weight of the ore being treated, an increasing improvement in conversion is exhibited over a range from the molecular quantity of sodium carbonate up to an excess of about 10% above the molecular quantity. But, with ore as fine as about 150 mesh, the continued improvement due to presence of sodium hydroxide is obscured at about 3% excess of sodium carbonate.

Some specific examples are given to illustrate the foregoing general statements:

Ore (celestite) in a state of subdivision to pass substantially all through a standard sieve of 40 meshes per inch, seventy-five percent through 150 mesh and sixty percent through 200 mesh was treated at a temperature of 95° C. to 100° C. with a quantity of sodium carbonate one and three-tenths percent above the molecular proportion, for five minutes in a suitable receptacle with agitation. Using a weight of water about five times the weight of the ore and no sodium hydroxide, a conversion of about 78% was effected. In tests otherwise identical, the addition of various quantities of sodium hydroxide up to twenty-seven percent of the weight of the ore showed a gradual increase in conversion up to about 84%. The above series of tests was repeated with a quantity of water about fifteen times the weight of the ore with the result that conversion varied from about 87% to about 93%. Further increase in water volume showed no improvement. Using the water to ore ratio of fifteen to one and maintaining the other factors constant, addition of sodium hydroxide up to about one hundred percent of the weight of the ore showed increase in conversion up to about 95% to 97%. Maintaining the quantity of caustic and increasing the excess of soda ash to about 13% in a series of steps, the conversion was brought up to from 99.5% to 99.8%. No appreciable difference in conversion was observed between 9% and 13% excess of soda ash.

While the use of these large quantities of caustic and soda ash are not objectionable when the process is carried out in connection with certain other processes, it is in some cases desirable to avoid them. We have found that this could be accomplished by treating ore in a state of subdivision to pass a 150 mesh sieve. Strontium sulphate recovered from our caustic purification process by treating the sludges with sulphuric acid is suitable.

Using this finely divided ore, the optimum water to ore ratio of fifteen to one and continuing the treatment for five minutes at a temperature of 95° C. to 100° C. we were able to secure a conversion of about 95%, using an excess of only 2.2% of soda ash above the theoretical and caustic soda to the extent of only about twenty percent of the weight of the ore. With ore of this degree of subdivision it is possible by the use of about 3% excess of soda ash to eliminate sodium hydroxide altogether, but, below 2% excess of sodium carbonate it increases the conversion quite materially (two or three percent).

In none of the above tests was there any marked tendency to occlusion of sodium sulphate in the strontium carbonate crystals.

The strontium carbonate is filtered and reslurried and filtered two or three times and is ready for use, with or without drying as may be required.

Having thus described our invention, what we claim is:

1. A process of converting strontium sulphate to strontium carbonate which comprises treating said sulphate with agitation with $Na_2CO_3$ in the presence of NaOH and water from 10 to 20 times the weight of the sulphate at a temperature from approximately 90° C. to 100° C., said sulphate being in a state of subdivision to pass a 40 mesh sieve, the quantity of $Na_2CO_3$ ranging between 1.3%–9% excess $Na_2CO_3$ over the molecular equivalent of $SrSO_4$ and the corresponding quantity of NaOH ranging between 27%–100% of the weight of the sulphate.

2. A process of converting strontium sulphate to strontium carbonate which comprises treating said sulphate with agitation with $Na_2CO_3$ in the presence of NaOH and water from 10 to 20 times the weight of the sulphate at a temperature from approximately 90° C. to 100° C., said sulphate being in a state of subdivision to pass a 150 mesh sieve, the quantity of $Na_2CO_3$ ranging between 2.2%–3% excess of $Na_2CO_3$ over the molecular equivalent of $SrSO_4$ and the corresponding quantity of NaOH ranging inversely between 20%–0% NaOH, the lesser value for $Na_2CO_3$ requiring the higher value of NaOH for maximum benefit.

HARVEY G. ELLEDGE.
ALFRED HIRSCH.